United States Patent [19]
Fikentscher et al.

[11] Patent Number: 4,592,758
[45] Date of Patent: Jun. 3, 1986

[54] AFTER-TREATMENT OF DYED TEXTILE MATERIALS OF NATURAL POLYAMIDES OR NYLONS WITH QUATERNIZED PIPERAZINE CONDENSATE

[75] Inventors: Rolf Fikentscher, Ludwigshafen; Heinrich Mertens, Frankenthal; Klaus Reincke, Wachenheim; Michele Vescia, Limburgerhof, all of Fed. Rep. of Germany

[73] Assignee: BASF Aktiengesellschaft, Ludwigshafen, Fed. Rep. of Germany

[21] Appl. No.: 729,229

[22] Filed: May 1, 1985

[30] Foreign Application Priority Data

May 10, 1984 [DE] Fed. Rep. of Germany ....... 3417240

[51] Int. Cl.⁴ .............................................. C09B 67/00
[52] U.S. Cl. ........................................ 8/567; 8/554; 8/606; 8/680; 8/97; 8/924; 8/128 A
[58] Field of Search ................................... 8/567, 554

[56] References Cited
U.S. PATENT DOCUMENTS 4,488,879 12/1984 Fikentscher et al. ................... 8/539

Primary Examiner—A. Lionel Clingman
Attorney, Agent, or Firm—Oblon, Fisher, Spivak, McClelland & Maier

[57] ABSTRACT

Textile materials of natural polyamides or nylons, dyed with a dye containing acid groups, are after-treated with a dilute aqueous solution of a cationic condensate which is obtained by reaction of (a) piperazine or a derivative of piperazine with (b) a bifunctional crosslinking agent, such as an epihalohydrin, in a molar ratio of from 1:0.5 to 1:1.1, and quaternization of the condensate with benzyl chloride, from 0.15 to 1.0 mole of benzyl chloride being employed per equivalent of nitrogen in the component (a) during the quaternization. This after-treatment improves the wetfastness of the dye.

5 Claims, No Drawings

AFTER-TREATMENT OF DYED TEXTILE MATERIALS OF NATURAL POLYAMIDES OR NYLONS WITH QUATERNIZED PIPERAZINE CONDENSATE

German Laid-Open Application DOS No. 2,801,535 discloses a process for the after-treatment of creatine-containing fiber material which has been dyed with 1:2 metal complex dyes containing groups which impart water-solubility and provided with an antifelting finish, in which process the dyed material is treated with a fatty acid/dialkanolamine reaction product and/or an alkali metal salt or ammonium salt of a fatty acid. German Laid-Open Application DOS No. 2,948,510 relates to a process for the production of dyed wool textiles which have an antifelting finish and are dyed with acid milling or metal complex dyes, wherein the textile material is after-treated with a liquor which contains a cationic fixing agent and, if required, a leveling or retarding agent which has an affinity for the dye. The cationic fixing agents used are dicyanodiamide/formaldehyde/ammonium chloride condensates. The conventional processes give dyeings which have unsatisfactory fastness properties, particularly where the hues are medium or deep. In the conventional after-treatment processes, dyes are removed from the dyed materials, so that in many cases lightening of the dyeing may occur or, where dye mixtures are used for dyeing the textile materials, hue changes may result.

It is an object of the present invention to provide a process for the after-treatment of textile materials of natural polyamides or nylons, which are dyed with anionic dyes, wherein the dyeings exhibit better wetfastness than those of the prior art, and the hue is not lightened or changed during the after-treatment of dyed materials.

We have found that this object is achieved, in accordance with the invention, by a process for the after-treatment of textile materials of natural polyamides or nylons, which have been dyed with a dye containing acid or sulfonamide groups, with dilute aqueous solutions of cationic condensates, if the cationic condensates used are products which are obtained by reacting (a) piperazine, bis-(1,4-aminopropyl)-piperazine, 1-aminoethylpiperazine, 1-methylpiperazine, 2-hydroxyethylpiperazine or bisbenzylpiperazine, or a mixture of these, with (b) ethylene chloride, an epihalohydrin, propylene chloride, 1,3-dichloro-2-hydroxypropane, bisepoxybutane or 1,4-dichlorobutane, or a mixture of these, in a molar ratio of from 1:0.5 to 1:1.1 and quaternization of the condensates with benzyl chloride, from 0.15 to 1.0 mole of benzyl chloride being used per equivalent of nitrogen in component (a) during the quaternization.

The wool after-treated according to the invention can be in the form of flocks, tops, yarn or piece goods. The treatment can be carried out on unchlorinated or chlorinated wool, but is particularly effective on chlorinated wool. In the chlorination step, treatment is initially carried out continuously or batchwise in a first treatment step with hypochlorous acid or with a chloroisocyanurate. Instead of the chlorination, it is also possible to treat the wool with a peroxysulfate or a permanganate. The wool is then rinsed, after which it is generally treated with an aqueous solution of a reducing agent, such as sodium bisulfite, sodium sulfite or sodium dithionite, and then rinsed again and, if required, dried.

It is then dyed or printed with metal complex, acid, chrome or reactive wool dyes in a conventional manner, and rinsed again. Dyes which are suitable can be found in the Color Index. These dyes are water-soluble dyes which contain one or more acid groups and/or sulfonamide groups as solubility-imparting constituents. For reasons of cost, 1:1 and 1:2 metal complex dyes and acid dyes are mainly used. The use of precisely these two classes of dyes has presented problems to date, because the dyeings obtainable with them on wool possessing antifelting properties were not sufficiently wetfast. After the dyeing procedure, the treatment according to the invention is carried out using the stated cationic condensates. After this treatment, the antifelting properties can be improved by treatment with the resins conventionally employed for this purpose. When dyed wool which has already been treated with resins is treated with the novel condensates, the wetfastness properties of the dyeing are also improved, but this is not a preferred procedure.

The novel process is also employed for the after-treatment of dyeings on silk and on nylons. For example, dyeings with anionic dyes on silk are generally even less fast than those with the same dyes on wool; because of the high value of this fiber material, this is frequently a cause for complaint. Moreover, for reasons relating to fashion, silk frequently has to be dyed with fluorescent dyes which possess poor wetfastness. Hence, it is necessary in practice to improve the wetfastness of dyeings on silk.

The cationic after-treatment agents used are substances which are obtained by reacting (a) piperazine, bis-(1,4-aminopropyl)-piperazine, 1-aminoethylpiperazine, 2-hydroxyethylpiperazine, bisbenzylpiperazine or 1-methylpiperidine with (b) ethylene chloride, an epihalohydrin (eg. epichlorohydrin or epibromohydrin), propylene chloride, such as 1,2-propylene chloride or 1,3-propylene chloride, 1,3-dichloro-2-hydroxypropane, bisepoxybutane or 1,4-dichlorobutane, or a mixture of these, in a molar ratio of from 1:0.5 to 1:1.1, preferably from 1:0.8 to 1:1.0, at a pH of from 6.5 to 12, preferably from 7 to 10, and then quaternizing the condensates with benzyl chloride. If necessary, the pH is established during the condensation by using a base, such as sodium hydroxide solution, potassium hydroxide solution, sodium carbonate, calcium oxide, calcium hydroxide, barium oxide or barium hydroxide. If the compounds of group (a) are employed in excess in the condensation, the basicity of these compounds results in an alkaline pH. The condensation is carried out in aqueous or alcoholic solution at a solids content of the solution of from 20 to 60% by weight and at from 60° to 100° C. Examples of suitable alcoholic solvents are ethylene glycol, propylene glycol, diglycol and/or neopentylglycol. The water-soluble unquaternized condensates have a viscosity of not less than 500 mPa.s in 45% strength aqueous solution at 20° C. Effective cationic after-treatment agents are obtained if the cationic condensates, particularly those obtained from piperazine and epichlorohydrin or ethylene chloride, are then quaternized with benzyl chloride.

For the quaternization of the condensates of components (a) and (b), from 0.15 to 1.0, preferably from 0.4 to 0.75, mole of benzyl chloride is employed per equivalent of N in component (a). The quaternization is preferably effected in an aqueous medium at from 60° to 100° C. Both the condensation reaction and the quaternization of the condensates can be carried out at above 100° C. and under superatmospheric pressure, as a result of which shorter reaction times are achieved. The aqueous or alcoholic solutions of the quaternized condensates can be used directly as the cationic condensate.

The quaternized cationic condensates are used for the after-treatment of dyed wool, which may or may not have an antifelting finish, silk or nylons, in the form of aqueous liquors whose content of the condensates is such that from 0.2 to 3, preferably from 0.3 to 1, % by weight of the 100% pure products pass onto the textile goods. The pH of the after-treatment liquors is from 5 to 9, preferably from 6 to 8. The after-treatment of the dyed materials can be carried out batchwise in dyeing apparatuses or, in the case of tops or open-width goods, continuously in backwashing baths, padding mangles or open-width washing machines. The batchwise treatment of the dyed materials with aqueous liquors lasts for from 5 to 30 minutes. In the continuous treatment, the contact time in the liquor is of the order of seconds, and fixing takes place during drying. The bath temperatures are from 20° to 80° C., preferably from 30° to 50° C. After the treatment with the quaternary cationic condensates, the material is rinsed if necessary and then dried. The drying temperature has no significant effect with regard to the improvement in the fastness properties. Drying is generally carried out at from 80° to 150° C.

After treatment with the condensates used according to the invention, dyed nylon or natural polyamide materials which have been after-treated according to the invention do not exhibit any lightening of hue and therefore also do not show any change in hue in the case of combination dyeings. Using the novel process, it is also possible for wool which has been dyed with acid dyes or metal complex dyes and has an antifelting finish to be provided with wetfastness properties which meet the stringent requirements of the International Wool Secretariat (IWS).

In the Examples, parts are by weight, and percentages are based on the weight of the substances and, in the case of the after-treatment agents, also on anhydrous active substance. The viscosities of the condensates were measured using a rotational viscometer (Haake, RV 3). The products below were used as after-treatment agents.

CONDENSATE 1

47.7 parts of condensation water were added to 95.5 parts (0.75 mole) of a 67.2% strength aqueous piperazine solution, and the solution was heated to 75° C. As soon as this temperature was reached, 69 parts (0.75 mole) of epichlorohydrin were run in at from 70° to 80° C. in the course of 1 hour, and the mixture was then heated for 3 hours at 80° C. During this time, the viscosity of the reaction mixture increased to about 500 mPa.s, while the pH decreased to 7.0. Thereafter, 134.3 parts of water and 59.7 parts of a 50% strength sodium hydroxide solution were added, and 94 parts (0.74 mole) of benzyl chloride were run in at 80° C. in the course of from 40 to 60 minutes. The benzylation was completed by heating the mixture for 2 hours at 80° C. The reaction mixture was cooled to 30° C., and 343.1 parts of 85% strength formic acid and 156.7 parts of water were then added. A total of 1,000 parts of condensate 1 in the form of a 20% strength solution were obtained.

CONDENSATE 2

346 parts (3.5 moles) of ethylene chloride were added to 717 parts (3.7 moles) of piperazine hexahydrate and 200 parts of water at from 70° to 80° C. in the course of from 3 to 4 hours. When the addition of ethylene chloride was complete, the reaction mixture was refluxed for 2 hours, after which 812 parts of a 50% strength aqueous potassium hydroxide solution and 2,500 parts of water were added (pH 11.3) and the mixture was heated at from 80° to 90° C. for 3 hours. The resulting suspension was diluted with water, and the finely crystalline polyethylenepiperazine was then separated by centrifuging and dried.

63.5 parts (0.5 equivalent) of benzyl chloride were added to a suspension of 56 parts of polyethylenepiperazine (0.5 equivalent of piperazine) in 80 parts of water at from 70° to 80° C. in the course of 10 minutes, and the reaction mixture was heated at 80° C. for 2 hours, after which it was cooled to 25° C. and diluted with 40 parts of water. A 50% strength aqueous solution of condensate 2 was obtained.

CONDENSATE 3

496.7 parts of epichlorohydrin were added to 516 parts (6 moles) of piperazine in 644 parts of water in the course of 50 minutes. During this procedure, the reaction temperature was allowed to increase from 50° C. to 88° C. The reaction mixture was then kept at 90°–95° C. for a further 4 hours, after which it had a viscosity of 4,400 mPa.s (20° C.) and a chloride content of 3.25 millimoles/g. 414 parts of water were added, and the mixture was cooled to room temperature (viscosity 270 mPa.s at 20° C.).

3,050 parts of propane-1,2-diol and 1,050 parts of water were added to 1,750 parts of this solution, 400 parts of 50% strength sodium hydroxide solution were introduced, and 882 parts of benzyl chloride were then added slowly at from 60° to 70° C. After a reaction time of 5 hours at 80° C., the clear solution had a chloride content of 1.59 millimoles/g, a pH of 3.9 and a viscosity of 90 mPa.s at 20° C. The content of active ingredient in the solution of condensate 3 was 21.9%.

CONDENSATE 4

528 parts (6 moles) of 98% piperazine (2% of water) were dissolved in 1,047 parts of propane-1,2-diol, and 497 parts (5.37 moles) of epichlorohydrin were added at from 60° to 90° C. in the course of 1 hour. The reaction solution was kept at 95° C. until the chloride titer remained constant at 2.3 millimoles/g and the viscosity was 25,700 mPa.s at 20° C. (4.5 hours).

440 parts of 50% strength aqueous sodium hydroxide solution and 2,630 parts of propanediol were added to 1,725 parts of this condensate, and 882 parts of benzyl chloride were introduced in the course of 1 hour at from 60° to 80° C. The alkylation was complete after a further 3 hours at 80° C. 1,720 parts of water were added to the mixture, which was then cooled to room temperature. The clear solution of condensate 4 had a chloride titer of 1.65 millimoles/g, a pH of 4.8 and a viscosity of 150 mPa.s at 20° C.

CONDENSATE 5

2,560 parts of ethylene glycol and 440 parts of 50% strength aqueous sodium hydroxide solution were added to 1,730 parts of the piperazine/epichlorohydrin condensate whose preparation is described under condensate 3. 882 parts of benzyl chloride were added in the course of 0.5 hour at from 60° to 80° C., after which the mixture was kept at 80° C. for 5 hours. After cooling to room temperature, the clear solution had a pH of 4.3, a chloride content of 2.05 millimoles/g and a viscosity of 285 mPa.s at 20° C. The active ingredient content was 27.8% of condensate 5.

CONDENSATE 6

The procedure described under condensate 5 was followed, except that the benzylation was carried out not in ethylene glycol but after the addition of the same amount of diethylene glycol to the piperazine/epichlorohydrin condensate. A clear solution of condensate 6 was obtained.

CONDENSATE 7

634 parts of water and 444 parts of epichlorohydrin were slowly introduced continuously into 516 parts of piperazine, the addition of the epichlorohydrin beginning at 50° C. and lasting for 1 hour. During the addition, the reaction temperature was increased to 90° C. and then kept at this level for 4 hours. The condensate then had a chloride content of 3.1 millimoles/g and a viscosity of 750 mPa.s at 20° C. It was brought to an active substance content of 40% with 369 parts of water. 130 parts of 50% strength sodium hydroxide solution and 248 parts of propanediol were added to 332 parts of the condensate, and 252 parts of benzyl chloride were introduced at from 50° to 70° C. in the course of 40 minutes. After 5.5 hours at from 70° to 80° C., the benzylation was complete. The content of active ingredient was brought to 22% by dilution with 784 parts of water. The clear stable solution had a pH of 4.4, a viscosity of 60 mPa.s at 20° C. and a chloride content of 1.6 millimoles/g. The content of active ingredient in the solution was 22% of condensate 7.

CONDENSATE 8

200 parts of N-2-aminoethylpiperazine were dissolved in 329 parts of water, and the solution was reacted with 129 parts of epichlorohydrin at from 60° to 80° C. in the course of 4 hours. The chloride titer of the viscous solution was then 2.1 millimoles/g, and the viscosity was 825 mPa.s at 20° C. The condensate was diluted with 540 parts of propylene 1,2-glycol, after which 444 parts of benzyl chloride were added in the course of 2 hours at 90° C. and the mixture was kept at 90° C. until the chloride titer remained constant (3.07 millimoles/g). During the benzylation, the reaction solution was kept at pH 8 with 62 parts of 50% stregth sodium hydroxide solution. The viscous reaction product was diluted with 703 parts of water to a clear solution of the cationic condensate 8, the solution containing 30% of active substance.

The dyes denoted by 1 to 5 in the Examples had the following constitution:

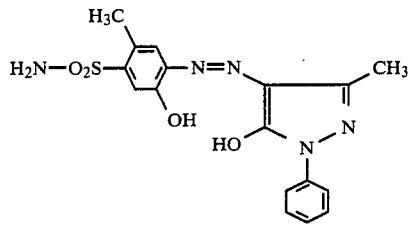

Dye 1

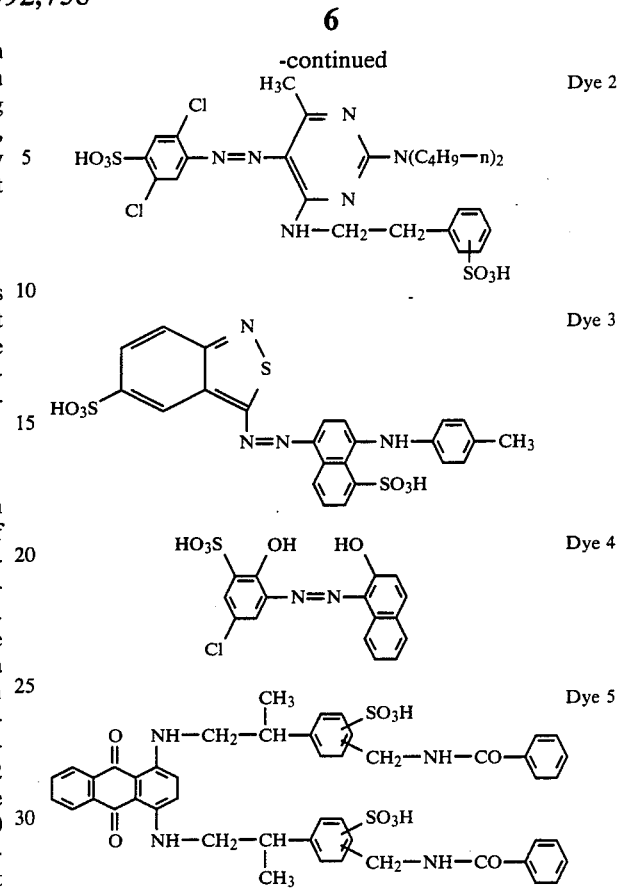

EXAMPLE 1

In order to reduce the tendency of wool yarn to felting, it was first treated with an aqueous solution which contained 3% of sodium dichloroisocyanurate, corresponding to 1.9%, based on the weight of the wool, of active chlorine. The pH of the solution was 4.8. The wool was then treated with an aqueous solution of sodium disulfite in order to remove the residual unbound chlorine. The chlorinated wool yarn was rinsed with water, dyed with an aqueous solution of the blue 1:2 chromium complex of the acid dye of Color Index No. 15,707 at 100° C., rinsed, and then divided into three parts.

(a) One part of the dyed yarn was immediately dried, and tested with regard to fastness to laundering and to perspiration by the test methods of the IWS. The values are shown in Table 1.

(b) The second part of the dyed wool yarn was aftertreated with an aqueous solution which contained 1% of a reaction product of 15 parts of dicyanodiamide, 40 parts of formaldehyde and 10 parts of ammonium chloride and a further 1% of a stearylamine (as the hydrochloride) which had been reacted with 40 moles of ethylene oxide. Treatment with the solution was carried out for 15 minutes at 50° C. and pH 7.5, after which the yarn was subjected to a cold rinse, mechanically dewatered and dried at 100° C.

(c) The third part of the dyed wool yarn was aftertreated with an aqueous solution which contained 1% of condensate 1 and had a pH of 7. The liquor was initially at 20° C. but was then rapidly heated to 50° C. and kept at this temperature for 15 minutes. The aftertreatment of the wool yarn was then complete, and the yarn was subjected to a cold rinse and was dried at 100° C. It was then tested, the results of the test being shown in FIG. 1. Hue change (H) and bleeding onto accompanying fabric were compared with the gray scale, rating 1 representing the lowest possible fastness and rating 5 the highest possible fastness.

(d) The fourth part of the dyed knitted piece was treated with a 0.03% strength aqueous solution of condensate 2 at 40° C., the liquor ratio being 1:30 and the pH of the treatment solution being 6. The antifelting treatment was then completed in the same way as in (b). The material treated in this manner was dried at 100° C.

TABLE 1

| Wool yarn treated by | IWS-TM 193 (Fastness to laundering) | | | IWS-TM 174 (Fastness to perspiration) | | | IWS-TM 165 (Fastness to crocking) |
|---|---|---|---|---|---|---|---|
| | H | Hercosett wool | C | H | Hercosett wool | C | |
| (a) | 3 | 1 | 4 | 4 | 1–2 | 3 | 4 |
| (b) Comparison | 3–4 | 2 | 4 | 4 | 2 | 3–4 | 3–4 |
| (c) according to the invention | 4–5 | 4–5 | 4–5 | 4–5 | 4–5 | 4–5 | 4 |
| Wool seal limit (machine wash) | 3 | 3–4 | 3 | 3 | 3–4 | 3 | 3 |

H = Change in hue
C = Cotton

The wool seal standard is achieved only in the case of the after-treatment according to the invention. For metal complex dyes with this deep hue, the comparative treatment according to (b) has scarcely any effect.

The yarn which has not been after-treated exhibits pronounced bleeding onto the accompanying knitted goods provided with an antifelting finish by the Hercosett process, while the yarn (c) after-treated according to the invention safely meets the requirements of the IWS.

EXAMPLE 2

A knitted piece consisting of all-wool carded yarn was washed, chlorinated in an aqueous liquor which contained 2% of sodium dichloroisocyanurate and had a pH of 3.2, and then dyed in an aqueous liquor which contained 2.5% of the red metal complex dye no. 1. The temperature during dyeing was 98° C. Thereafter, the knitted piece was divided up and further processed in different ways:

(a) The first part was dried without further treatment.

(b) In order to improve the antifelting properties, the second part of the knitted piece was treated with a 0.07% strength aqueous solution of a commercial polyamidoamine which was crosslinked with epichlorohydrin, the liquor ratio being 1:30, and was then dried and tested with regard to fastness properties. The results are shown in Table 2.

(c) The third part was treated, as described in (b), with a solution of a polyamidoamine crosslinked with epichlorohydrin, dried and then after-treated with 1% of a reaction product of 20 parts of dicyanodiamide, 40 parts of formaldehyde and 12 parts of ammonium chloride and a further 1% of stearylamine which had been reacted with 40 moles of ethylene oxide. The temperature was 25° C., the pH 8 and the duration 20 minutes. After rinsing, drying was carried out at 100° C.

and tested according to the IWS standards. The results are shown in Table 2.

TABLE 2

| Knitted piece produced from wool treated by | IWS-TM 193 (Fastness to laundering) | | | IWS-TM 174 (Fastness to perspiration) | | | IWS-TM 165 (Fastness to crocking) |
|---|---|---|---|---|---|---|---|
| | H | Hercosett wool | C | H | Hercosett wool | C | |
| (a) | 3–4 | 1–2 | 4 | 3–4 | 2 | 4 | 4 |
| (b) | 4 | 2 | 4 | 3–4 | 2–3 | 4 | 3–4 |
| (c) | 4 | 2–3 | 4 | 3–4 | 2–3 | 4 | 3 |
| (d) | 4 | 4–5 | 4–5 | 4 | 4–5 | 4–5 | 4 |

For this deep dyeing, the wool seal standard (cf. Table 1) is achieved only by the novel after-treatment (d) of the wool provided with an antifelting finish with chlorine and a synthetic resin.

EXAMPLE 3

(a) Wool tops were first chlorinated in a continuous process in strongly acidic hypochlorite solution at pH 1.2 until 1.8% of active chlorine had been absorbed, after which chlorine was removed by treatment with sodium sulfite solution and the tops were then treated with a commercial aqueous solution of a polyamidoamine resin crosslinked with epichlorohydrin. The resin coating was 1.8%. The material which had been provided with an antifelting finish in this manner and dried was then dyed in an aqueous liquor at 103° C. so that the goods contained 4% of the 2 chromium complex of the black acid dye of Color Index No. 15,711; the material was then rinsed and dried. The fastness properties of this material are shown in Table 3.

(b) As described under (a), wool tops were treated by chlorination in a strongly acidic hypochlorite solution at pH 1.2 until 1.8% of active chlorine had been absorbed, after which chlorine was removed and the tops were dyed with an aqueous liquor so that the goods likewise contained 4% of the metal complex dye stated under (a). The material was then rinsed and, in order to improve the fastness properties, was treated with an aqueous solution of condensate 3 at 40° C. The pH of the aqueous solution of the condensate was 7.5, and the coating was 0.7%. The material treated in this manner was then after-treated with the same epichlorohydrin-crosslinked polyamidoamine resin as in case (a). The resin coating in this case was likewise 1.8%. The fastness properties of this material are shown in Table 3.

TABLE 3

| Wool tops treated by | IWS-TM 193 (Fastness to laundering) | | | IWS-TM 174 (Fastness to perspiration) | | | IWS-TM 165 (Fastness to crocking) |
|---|---|---|---|---|---|---|---|
| | H | Hercosett wool | C | H | Hercosett wool | C | |
| (a) | 3–4 | 1 | 4 | 4 | 2 | 4 | 4 |
| (b) | 4–5 | 4–5 | 4–5 | 4–5 | 4 | 4–5 | 4 |

As shown in the Table, the black dyeing obtained on wool with a metal complex dye meets the superwash requirements of the IWS in respect of wetfastness and fastness to crocking.

EXAMPLE 4

(a) Wool yarn which, in the form of tops, had been chlorinated continuously by the Hercosett process and provided with an antifelting finish by means of a resin coating consisting of a polyamidoamine crosslinked with epichlorohydrin was knitted, and the knitted goods were then dyed with an aqueous liquor which contained 4% of the 1:2 chromium complex of the black acid dye of Color Index No. 15,711. The material was rinsed and dried, and its fastness properties were tested.

(b) Dyed knitted goods obtained as described in (a) were after-treated with an aqueous liquor of condensate 4. The liquor was at 50° C. and had a pH of 7.5, and the treatment time was 20 minutes. After this treatment, 1% of the condensate 4 was found to have been taken up.

(c) Dyed knitted goods obtained as described in (a) were treated at 50° C. with an aqueous solution which contained 1% of the sodium salt of a sulfuric acid ester of an oxyethylation product obtained from a $C_{16}/C_{18}$ fatty alcohol and 80 moles of ethylene oxide as a dispersant. This treatment lasted for 10 minutes, after which an aqueous solution of condensate 4 was added to this bath. The material was then treated for 20 minutes at 50° C. and pH 7, after which it was rinsed. After this treatment, the material contained 1% of condensate 4.

The samples obtained as described in (a), (b) and (c) were investigated with regard to fastness properties. The results are shown in Table 4.

TABLE 4

| Knitted goods of wool yarn treated according to | IWS-TM 193 (Fastness to laundering) Hercosett wool | IWS-TM 174 (Fastness to perspiration) Bleeding of Hercosett wool | IWS-TM 165 (Fastness to crocking) C |
|---|---|---|---|
| (a) | 1 | 3 | 4 |
| (b) | 2–3 | 4 | 2 |
| (c) | 3–4 | 4 | 3 |
| IWS Limit | 4 | 4 | 3 |

As the values show, the after-treatment according to the invention also improves the wetfastness properties in the case of wool which has first been treated with resins and then dyed, although with this sequence of operations the fastness to crocking may be reduced by any type of cationic after-treatment agent (b). By combining the novel agents with suitable dispersants, it is possible to reduce this disadvantage (c).

EXAMPLE 5

(a) Wool muslin was chlorinated with 3% of sodium dichlorocyanurate in an aqueous solution at pH 4, dechlorinated in another bath by the action of sodium sulfite and then rinsed. The material pretreated in this manner was printed in two colors; this was done by applying two broad strips of a printing paste in each case, one of which contained 15 g/kg of the yellow dye 2 while the other contained 30 g/kg of the red 1:2 chromium acid complex of the dye 1. The prints were aged for 30 minutes in saturated steam at 102° C. and then rinsed with cold water. Part of the fabric was dried, and its fastness properties were tested. The results obtained are shown in Table 5.

(b) The other part of the printed fabric obtained as described in (a) was treated for 15 minutes with an aqueous solution of condensate 5 at 40° C., the pH of the treatment solution being 6. The treated fabric was found to have taken up 0.8% of condensate 5. The material was then dried, and its fastness properties were tested. The results are likewise shown in Table 5.

TABLE 5

| | Fastness to alkaline perspiration (DIN 54,020) | | | Heavy-duty water-fastness (DIN 54,006) | | |
|---|---|---|---|---|---|---|
| | H | Wool | C | H | Wool | C |
| Wool muslin printed yellow and treated by | | | | | | |
| (a) | 4 | 1 | 2 | 4 | 3–4 | 4 |
| (b) | 4 | 4–5 | 4–5 | 4–5 | 4–5 | 4–5 |
| Wool muslin printed red and treated by | | | | | | |
| (a) | 3–4 | 1 | 1–2 | 3–4 | 2 | 3–4 |
| (b) | 4 | 3–4 | 4 | 4–5 | 4 | 4–5 |

EXAMPLE 6

(a) Wool gabardine was dyed with an aqueous liquor containing 3.5% of the violet 1:1 chromium complex of the acid dye of Color Index No. 16260, in a conventional manner, in a bath containing sulfuric acid, at 100° C. After the dyeing and rinsing procedures, one part of the fabric was neutralized with an aqueous solution of sodium acetate, rinsed and dried, and its fastness properties were tested.

(b) The other part of the fabric dyed and rinsed as described in (a) was treated with an aqueous liquor containing 5% of sodium acetate and 2.5% of the water-soluble condensate 6. The pH of this liquor was 8, the treatment time 15 minutes and the temperature of the liquor 40° C. The fastness properties shown in Table 6 were tested for both samples.

TABLE 6

| Wool gabardine treated according to | Fastness to | | |
|---|---|---|---|
| | Heavy-duty water-fastness DIN 54,006 | alkaline perspiration according to DIN 54,020 | acidic perspiration according to DIN 54,020 |
| (a) | 2 | 3 | 2 |
| (b) | 4 | 4 | 3–4 |
| Wool seal limit (handwash) | 3 | — | — |

The novel after-treatment of the dyeing by method (b) allows the wool seal to be granted to wool fabric dyed with 1:1 metal complex dyes.

EXAMPLE 7

(a) A tricot produced from nylon 6 was dyed in a conventional manner at 100° C. with an aqueous liquor containing 2.8% of the blue dye 3 and 0.8% of the violet dye 4. After it had been dyed, the material was rinsed.

(b) A tricot obtained as described in (a) was treated with an aqueous solution of the condensate 7 at 40° C., the treatment time being 15 minutes and the pH of the liquor 8. After the treatment, the tricot had taken up 1% of condensate 7. The values for the fastness to alkaline perspiration are shown in Table 7.

TABLE 7

| Nylon treated by | Fastness to alkaline perspiration (DIN 54,020) | | |
|---|---|---|---|
| | H | Nylon | C |
| (a) | 4–5 | 2 | 2 |
| (b) | 4–5 | 4–5 | 3–4 |

As the results show, the dyed nylon material which has not been after-treated exhibits pronounced bleeding onto accompanying white fabric under the action of perspiration, whereas the treated material produces only slight discoloration of the white goods.

EXAMPLE 8

(a) A natural silk fabric was dyed at 98° C. in an aqueous liquor containing 4% of the blue dye 5, and was then rinsed and dried.

(b) A silk fabric dyed as described in (a) was after-treated with an aqueous liquor containing 1.5% of condensate 7 in solution. The treatment temperature was 50° C. and the pH 8. The results of fastness tests are shown in Table 8.

TABLE 8

| Silk fabric obtained by | Heavy-duty water-fastness DIN 54,006 | | | Fastness to alkaline perspiration DIN 54,020 | | |
|---|---|---|---|---|---|---|
| | H | Silk | C | H | Silk | C |
| (a) | 4 | 2–3 | 4–5 | 4 | 2–3 | 4–5 |
| (b) | 4–5 | 4–5 | 4–5 | 4 | 4–5 | 4–5 |

As shown by the values for the fastness properties of the dyeings, sufficiently fast brilliant blue hues can be produced on silk only by means of the after-treatment according to (b).

We claim:

1. A process for the after-treatment of textile materials of natural polyamides or nylons, which have been dyed with a dye containing acid groups, which consist essentially of:

(1) treating said dyed textile material with a dilute aqueous solution of a cationic quaternary condensate which is obtained by reaction of (a) piperazine, bis-(1,4-aminopropyl)-piperazine, 1-amino-ethylpiperazine, 2-hydroxyethylpiperazine, bisbenzylpiperazine or 1-methylpiperazine, or a mixture of these, with (b) ethylene chloride, an epihalohydrin, propylene chloride, 1,3-dichloro-2-hydroxypropane, bis-epoxybutane or 1,4-dichlorobutane, or a mixture of these, in a molar ratio of from 1:0.5 to 1:1.1, and (2) quaternizing the condensate with benzyl chloride, from 0.15 to 1.0 mole of benzyl chloride being employed per equivalent of nitrogen in component (a) during the quaternization.

2. The process as claimed in claim 1, wherein the pH of the aqueous solution of the cationic condensate is from 5 to 9.

3. The process as claimed in claim 1, wherein, as a result of the after-treatment, from 0.2 to 3% by weight of the cationic condensate is applied onto the textile material.

4. The process as claimed in claim 1, wherein wool which has been provided with an antifelting finish is after-treated.

5. The process as claimed in claim 1, wherein wool which has been provided with an antifelting finish and dyed with a metal complex dye is after-treated.

* * * * *